US010122701B2

(12) United States Patent
Uiterwijk

(10) Patent No.: US 10,122,701 B2
(45) Date of Patent: Nov. 6, 2018

(54) CROSS-DOMAIN SINGLE LOGIN

(71) Applicant: Red Hat, Inc., Raleigh, NC (US)

(72) Inventor: Patrick Uiterwijk, Houten (NL)

(73) Assignee: Red Hat, Inc., Raleigh, NC (US)

( * ) Notice: Subject to any disclaimer, the term of this patent is extended or adjusted under 35 U.S.C. 154(b) by 365 days.

(21) Appl. No.: 14/950,034

(22) Filed: Nov. 24, 2015

(65) Prior Publication Data

US 2017/0149766 A1 May 25, 2017

(51) Int. Cl.
*G06F 21/00* (2013.01)
*H04L 29/06* (2006.01)
*G06F 21/42* (2013.01)
*G06F 21/41* (2013.01)

(52) U.S. Cl.
CPC .......... *H04L 63/0815* (2013.01); *G06F 21/41* (2013.01); *G06F 21/42* (2013.01); *H04L 63/0884* (2013.01)

(58) Field of Classification Search
CPC .......... G06F 21/30; G06F 21/31; G06F 21/33; G06F 21/335; G06F 21/41; G06F 21/42
See application file for complete search history.

(56) References Cited

U.S. PATENT DOCUMENTS

| 7,861,077 | B1 * | 12/2010 | Gallagher, III ......... G06F 21/33 713/155 |
| 8,291,088 | B2 | 10/2012 | Marcus et al. |
| 8,613,067 | B2 | 12/2013 | Lambiase et al. |
| 9,130,927 | B2 | 9/2015 | Ju et al. |
| 2004/0123144 | A1 | 6/2004 | Chan et al. |
| 2010/0043065 | A1 | 2/2010 | Bray et al. |
| 2013/0133056 | A1 | 5/2013 | Taylor |

FOREIGN PATENT DOCUMENTS

| CN | 104320423 | 1/2015 |
| CN | 104836803 | 8/2015 |

OTHER PUBLICATIONS

Upreti, "Using Single Sign On in Multiple Applications Sharing Same Domain", Jun. 14, 2010, excerpt from http://forums.asp.net/t/1023838.aspx?Using+Single+Sign+On+in+Multiple+Applications+Sharing+Same+Domain (4 pages).

(Continued)

*Primary Examiner* — Edward Zee
(74) *Attorney, Agent, or Firm* — K&L Gates LLP

(57) ABSTRACT

Cross-domain single login is disclosed. In an example system, a first application server hosts a first application that has a first user-visible page. The first application server is configured to serve, the first user-visible page on a user device. The first application server is also configured to request a first hidden page. An authentication server is configured to receive a first hidden authentication request from the user device, to obtain a first authentication result, and send a first message to the user device. The first message may include the first authentication result obtained by the authentication server based on the first hidden authentication request. The user device is configured to send, a second message to the first user-visible page based on the first message.

20 Claims, 7 Drawing Sheets

(56) References Cited

OTHER PUBLICATIONS

"Chapter 16 Implementing Cross-Domain Single Sign-On with Cookie Hijacking Prevention", excerpt from http://docs.oracle.com/cd/E19575-01/820-3746/6nf8qcveh/index.html; Accessed Date: Sep. 17, 2015; (14 pages).
"Single Sign on Across multiple domains [Closed]", excerpt from http://stackoverflow.com/questions/44509/single-sign-on-across-multiple-domains; Accessed Date: Sep. 17, 2015; (3 pages).
"Cross-Domain Single Sign-On", excerpt from https://publib.boulder.ibm.com/tividd/td/ITAME/SC32-1359-00/en_US/HTML/am51_webseal_guide79.htm; Accessed Date: Sep. 17, 2015; (2 pages).

* cited by examiner

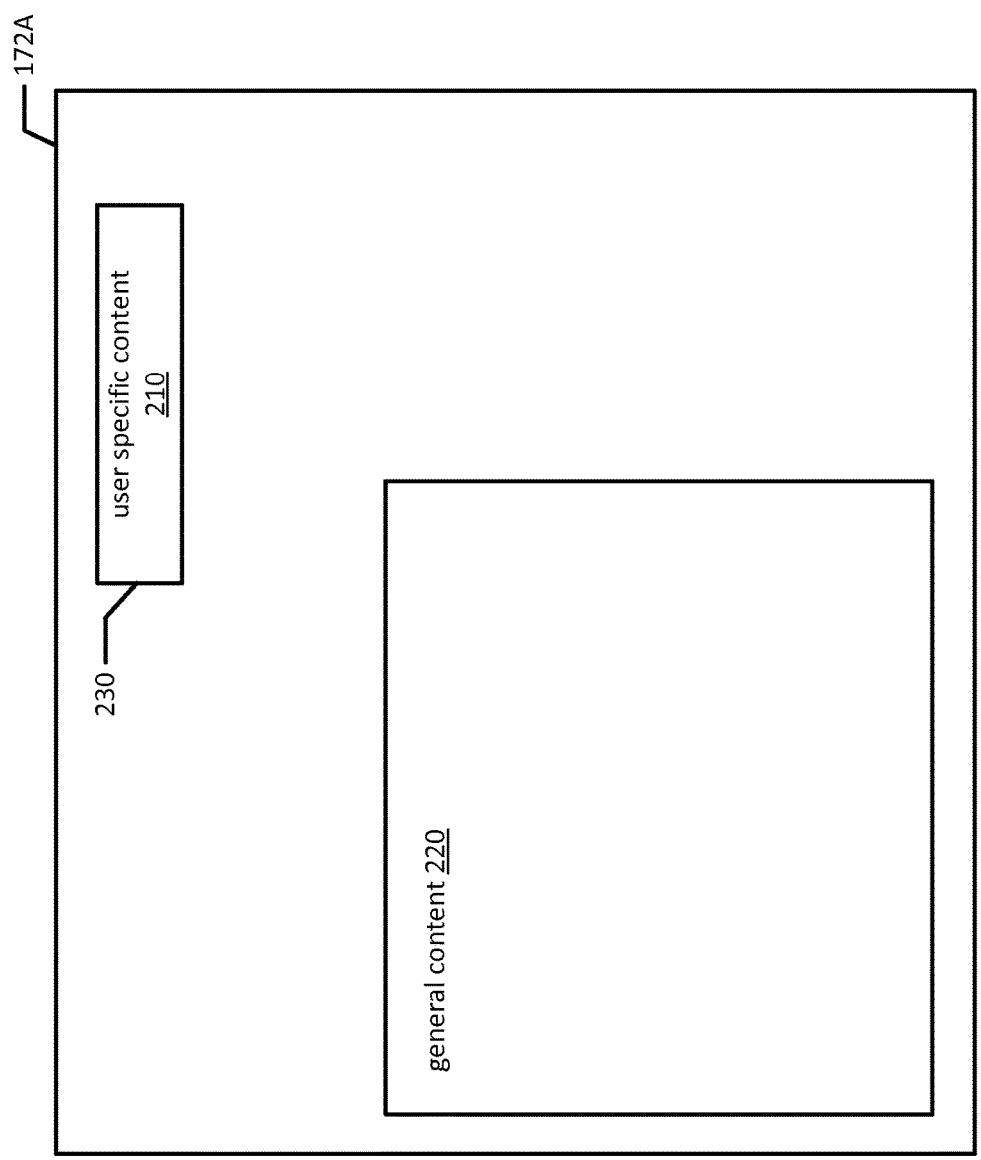

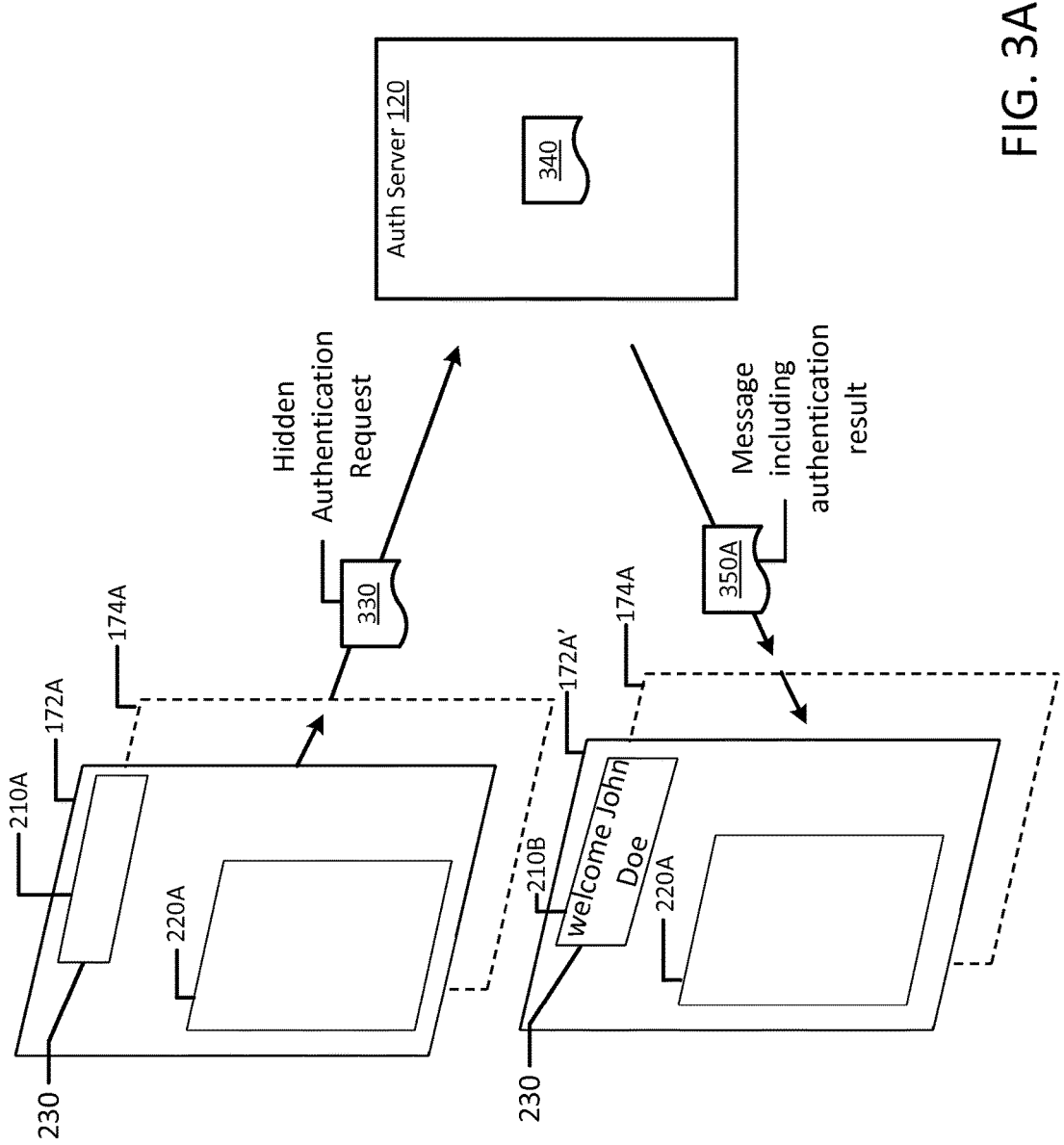

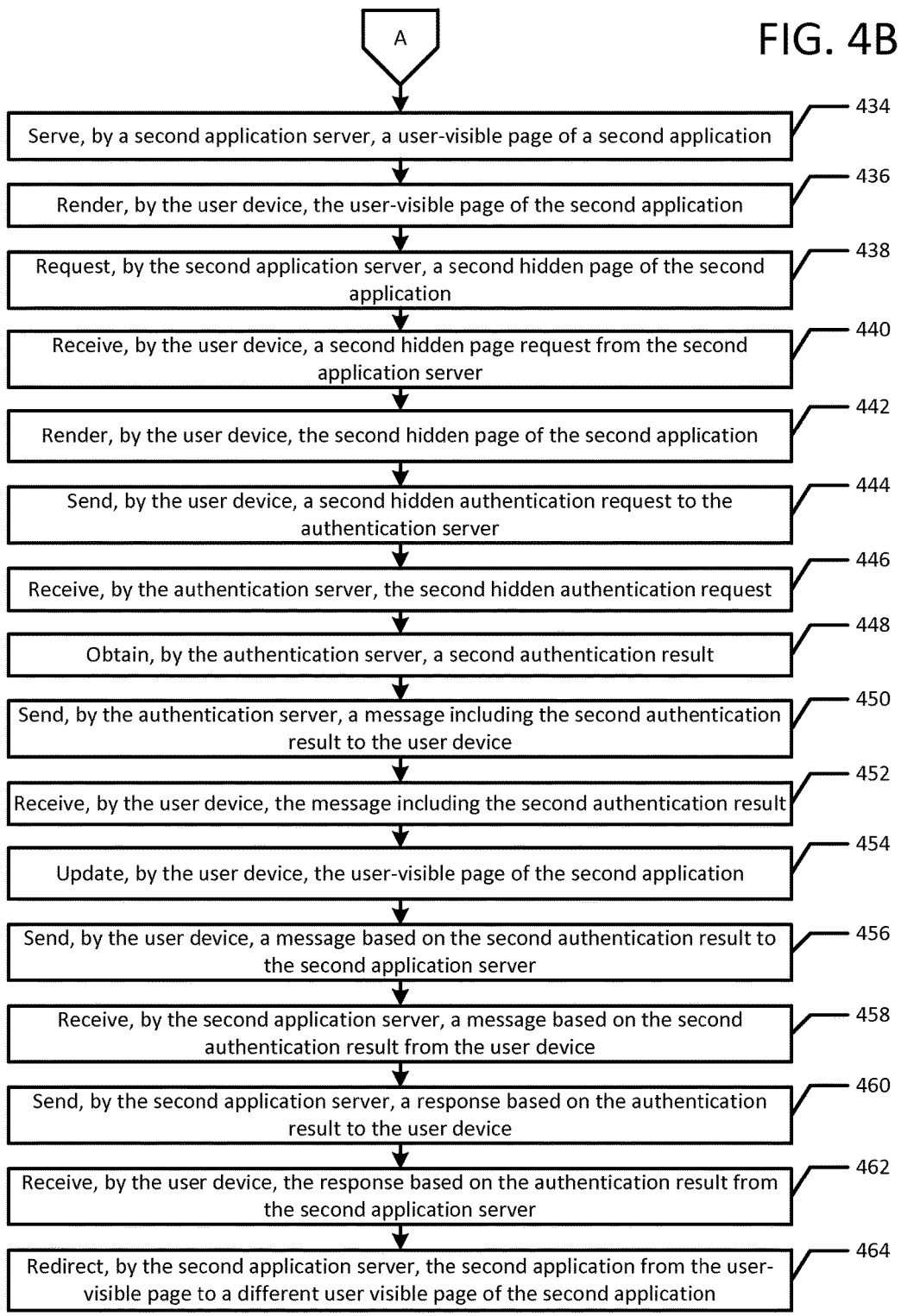

CROSS-DOMAIN SINGLE LOGIN

BACKGROUND

Users of computer systems may be required to login and be authenticated to use various application programs and services. User authentication is utilized by various websites and applications to ensure that the users accessing the application's resources are registered users. Additionally, user authentication allows applications to provide customized information to specific users to enhance a user's experience while using the application. Generally, when a user wants to access many different applications, the user may be required to login to each one of the many different applications by entering login information including a user name and password. However, it may be inconvenient for users to have to remember many different user names and passwords and to enter login information each time they use an application or navigate to a new application.

SUMMARY

The present disclosure provides a new and innovative system, methods and apparatus for cross-domain single login. In an example embodiment, a system includes a first application server and an authentication server. The first application server hosts a first application that has a first user-visible page. Additionally, the first application server is configured to serve, the first user-visible page, of the first application, on a user device. The first application is configured to operate on a first domain, and the first user-visible page includes first user-specific content and first general content. The first application server is also configured to request, a first hidden page of the first application. The authentication server is configured to receive, a first hidden authentication request from the user device. Additionally, the authentication server is configured to obtain, a first authentication result. The first authentication result includes either a positive authentication result or a negative authentication result. Furthermore, the authentication server is configured to send, a first message to the user device. The first message may include the first authentication result obtained by the authentication server based on the first hidden authentication request. The user device is configured to send, a second message to the first user-visible page based on the first message.

In an example embodiment, a method for providing cross-domain single login includes serving, by a first application server to a user device, a first user-visible page of a first application, wherein the first application is configured to operate on a first domain, and the first user-visible page includes first user-specific content and first general content. Responsive to serving the first user-visible page of the first application, requesting, by the first application server, a first hidden page of the first application. The user device is configured to send a first hidden authentication request to an authentication server, and responsive to sending the first hidden authentication request, receive a first message from the authentication server, the first message including a first authentication result. Also, responsive to sending the first hidden authentication request, receiving, by the first application server, a second message from the user device. The second message is based on the first authentication result obtained by the authentication server based on the first hidden authentication request, and the first authentication result includes one of a positive authentication result and a negative authentication result.

In an example embodiment, a method for providing cross-domain single login includes receiving, by an authentication server, a first hidden authentication request from a first hidden page of a first application. The first hidden page is rendered in response to a first application server requesting the first hidden page based on the first application server serving a first user-visible page of the first application, the first application is configured to operate on a first domain, and the first user-visible page includes first user-specific content and first general data. Response to receiving the authentication request, obtaining, by the authentication server, a first authentication result. The first authentication result includes one of a positive authentication result and a negative authentication result. Also, in response to obtaining the first authentication result, sending, by the authentication server, a first message to the first hidden page. The first hidden page is configured to send a second message to the first user-visible page upon receiving the first message from the authentication server. Receiving, by the authentication server, a second hidden authentication request from a second hidden page of a second application. The second hidden page is rendered in response to a second application server requesting the second hidden page based on the second application server serving a second user-visible page of the second application, the second application is configured to operate on a second domain. The second domain is different than the first domain, and the second user-visible page includes user-specific content and general data. Also, in response to receiving the second authentication request, obtaining, by the authentication server, a second authentication result. The second authentication result includes one of a positive authentication result and a negative authentication result. In response to obtaining the second authentication result, sending, by the authentication server, a third message to the second hidden page. The second hidden page is configured to send a fourth message to the second user-visible page upon receiving the third message from the authentication server.

In an example embodiment, a non-transitory machine readable medium storing code, which when executed by a user device, is configured to render a first user-visible page, of a first application, received from a first application server. The first application is configured to operate on a first domain. Receive a request for a first hidden page from the first application server. Responsive to receiving the request for the first hidden page, render, the first hidden page, of the first application. Send a first authentication request to an authentication server. Responsive to sending the first hidden authentication request, receive, a first message. The first message includes a first authentication result obtained by the authentication server based on the first hidden authentication request. The first authentication result includes one of a positive authentication result and a negative authentication result. Also, responsive to receiving the first message from the authentication server, send, a second message to the first hidden page.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 2 illustrates a block diagram of an example user-visible page according to an example embodiment of the present disclosure.

FIG. 3A illustrates a block diagram of an example user device with a user-visible page and a hidden page interacting with an authentication server according to an example embodiment of the present disclosure.

FIGS. 4A and 4B illustrate a flowchart of an example process for cross-domain single login according to an example embodiment of the present disclosure.

DETAILED DESCRIPTION OF EXAMPLE EMBODIMENTS

Figure 1:
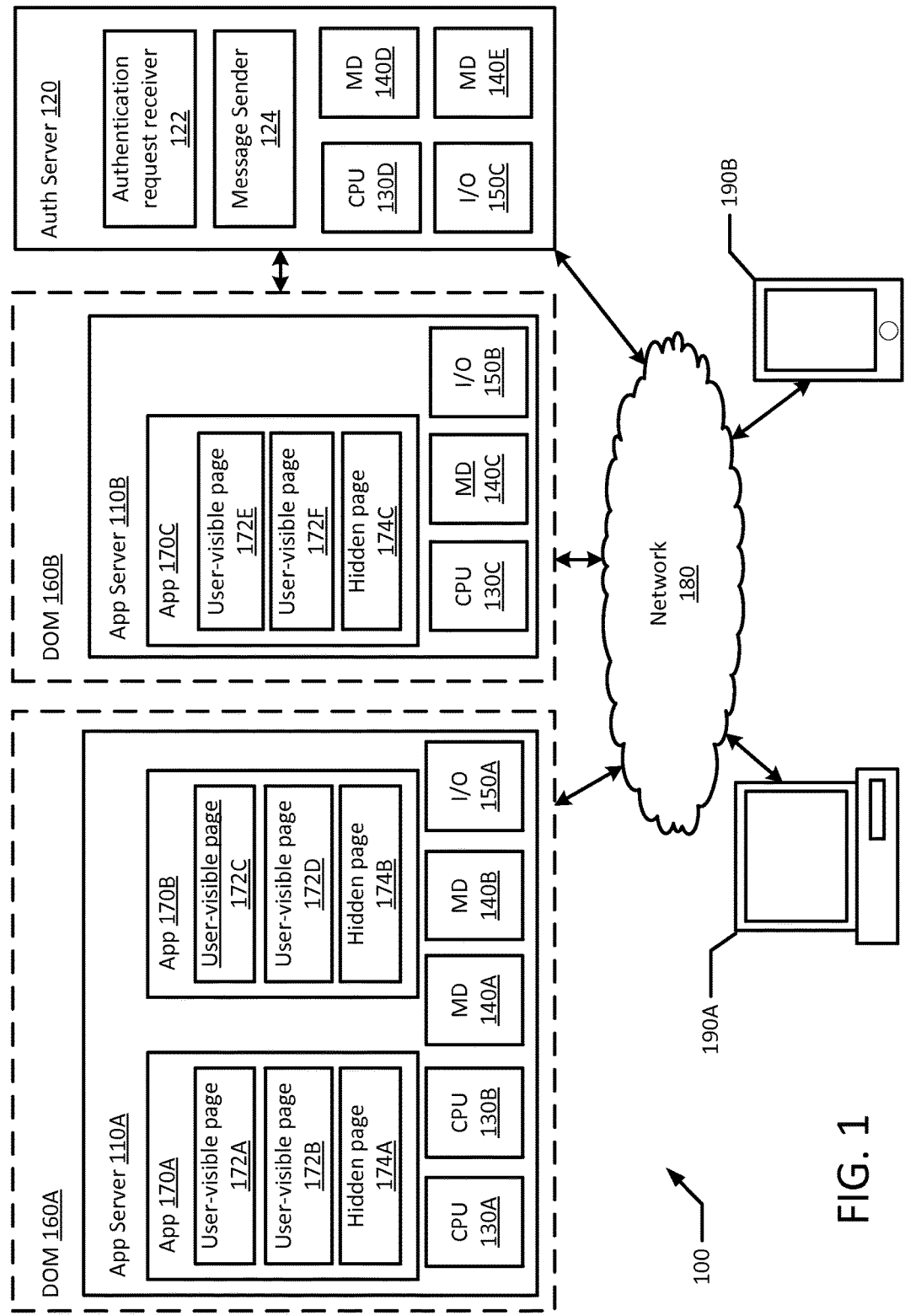
FIG. 1 illustrates a block diagram of an example cross-domain authentication system according to an example embodiment of the present disclosure.

Techniques are disclosed for providing cross-domain single login for applications (e.g., web applications). Some applications may share a single user information directory across all applications on a domain, which allows the user to utilize all of the applications sharing the single user information directory. However, in more complex environments, these systems are inadequate because often times users will use applications that have different user information directories. Additionally, users may be known by many different user names and may use several different passwords.

Typically, traditional single login solutions employ the concept of tokens or cookies (e.g., HTTP cookies) that are sent to a user's browser, which allows the user to access various applications and content provided by an application server on a specific domain framework. This solution may allow a user device to share the tokens or cookies between applications. For example, a browser on the user device may share tokens or cookies to allow for single login of multiple applications. However, sharing a cookie provides several disadvantages. First, sharing a cookie between applications will not work if the applications are based on different frameworks (e.g., applications structured to operate on different domains). For example, if a user attempts to access an application X on Domain A, the user may be prompted to login and will be allowed access to application X. A token or cookie may be sent to the user's browser, and from that point until the session terminates or expires, the browser may present the token or cookie to any server on Domain A. For example, if the user wants to access application Y on Domain A, while still in the same session, the browser may present application Y with the token or cookie and the user will be allowed access to application Y. However, if the user wants to access application Z on Domain B (different than Domain A), the token or cookie used for Domain A may not be sent because the domains are different. The server (or policy agent) in Domain B may deny access because no token or cookie is present. Additionally, the technique of sharing tokens or cookies to multiple applications may require that the applications use the same database that stores user credentials or the applications may have to use the same secret key or share a secret key.

Second, sharing a token or cookie between applications decreases the security available to the user. For example, if an untrusted application on Domain A hijacks the token or cookie, the application may impersonate the user and access another application on the same domain or may access other protected web resources that would be accessible to an authenticated user. Furthermore, the untrusted application may obtain and/or modify profile information of the user. As discussed above, if the token or cookie can only access servers on Domain A, the security threat is limited to Domain A, but if a shared token or cookie worked across multiple domains, then the security threat would be even more expansive.

Aside from the security risks of sharing cookies between applications, an application provider may want to offer single login when using different web application frameworks (e.g., web applications hosted on separate domains). Single login allows the user to be signed on to all applications automatically after logging in to just one application without having to manually login for every application. The present disclosure provides systems, methods and apparatus for cross-domain single login that enable single sign on across multiple domains, which advantageously allows a user to navigate to multiple different applications regardless of framework or domain. Considering the wide range of applications and web resources that users may frequently utilize on a daily basis, users are likely to encounter applications on multiple different frameworks (i.e., applications created using different computer languages or applications constructed using different framework architecture) because applications are developed by several different vendors.

In accordance with an example embodiment of the present disclosure, when a user attempts to access a web resource (e.g., a webpage on an application that is designed with the cross-domain web-based single login functionality) from a user device (e.g., a smart phone, tablet, computer, etc.), an application server will serve the webpage (e.g., a user-visible page) to a browser on the user device. The attempt to access the web resource may trigger the application server to request a hidden page on the user device. In an example embodiment, the hidden page may be requested regardless of the entry point (e.g., user-visible pages, hyperlinks, etc.) associated with the application that the user attempts to access. The hidden page is associated with the application and may be rendered in the background unbeknownst to the user. For example, each application may have its own associated hidden page. After the hidden page request is received by the user device (e.g., by the browser of the user device), the user device may send a hidden authentication request to an authentication server. The hidden authentication request may also occur in the background unbeknownst to the user, while the content of the user-visible page is still loading on the user device. Thus, the user is advantageously able to receive and view any general content (e.g., news stories, sporting event scores or schedules, online recipes, etc.) while the system is authenticating the user in the background. Then, the authentication server may use the hidden authentication request to obtain an authentication result. For example, the authentication server may receive a positive authentication result (i.e., authentication server was able to confirm the user credentials) or the authentication server may receive a negative authentication result (i.e., authentication server was unable to confirm the user credentials). Then, the authentication server may send a message including the authentication result to the user device. In the case of a positive authentication result, the user device may then update user-specific content on the user-visible page without changing the layout of the user-visible page and without interrupting the user's viewing of the user-visible page.

The user-specific content may be a user name or other user permission sets. For example, the user-specific content may be a welcome message near the top of the user-visible page such as "Welcome John Doe." Depending on the speed of the authentication, the user-specific content may be filled (e.g., updated or rendered) on the user-visible page while the page is still loading, or after the general content is already visible to the user. Regardless of when the user-specific information is filled on the user-visible page, the layout of the page may remain unchanged, which advantageously allows a user to enjoy application content without the delay of excessive loading times and without inconvenience of page refreshes. For example, a page refresh may cause a user to lose his or her place on a page while reading an article, and the user would have to inconveniently waste time finding his or her place after being interrupted.

FIG. 1 depicts a high-level component diagram of an example cross-domain authentication system 100 in accordance with one or more aspects of the present disclosure. The cross-domain authentication system 100 may include one or more application servers 110A-B and an authentication server 120. Each application server 110A-B and authentication server 120 may in turn include one or more physical processors (e.g., CPU 130A-D) communicatively coupled to memory devices (e.g., MD 140A-E) and input/output devices (e.g., I/O 150A-C). Each application server 110A-B may operate on a domain (e.g., DOM 160A-B) and may include one or more applications (e.g., App 170A-C). In an example embodiment, an application may include one or more associated user-visible pages 172A-F and a hidden page 174A-C.

As used herein, physical processor or processor 130A-D refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 140A-E refers to a volatile or non-volatile memory device, such as RAM, ROM, EEPROM, or any other device capable of storing data. As discussed herein, I/O device 150A-C refers to a device capable of providing an interface between one or more processor pins and an external device capable of inputting and/or outputting binary data.

Processors 130A-D may be interconnected using a variety of techniques, ranging from a point-to-point processor interconnect, to a system area network, such as an Ethernet-based network. Local connections within each node (e.g., application servers 110A-B and authentication server 120), including the connections between a processor 130A-D and a memory device 140A-E may be provided by one or more local buses of suitable architecture, for example, peripheral component interconnect (PCI).

In an example embodiment, the application servers 110A-B and the authentication server 120 may communicate via a network 180. For example, the network 180 may be a public network (e.g., the Internet), a private network (e.g., a local area network (LAN) or wide area network (WAN), or a combination thereof. In an example embodiment, application server 110A may communicate with authentication server 120 wirelessly via the Internet, while application server 110B may communicate with the authentication server 120 via an ethernet connection. For example, a user may access one or more of the user-visible pages 172A-F via a user device 190A-B (e.g., using a browser on the user device) by establishing a connection to the one or more application servers 110A-C via the network 180. In an example embodiment, the application servers (110A-B) and the authentication server 120 may all communicate wirelessly via the Internet. In an example embodiment, the application servers (110A-B) and the authentication server 120 may all communicate via a wired connection.

In an example embodiment, the authentication server 120 may include a specialized authentication request receiver 122, which is configured to receive and process hidden authentication requests received from the user devices 190A-B. Additionally, the authentication server 120 may include a specialized message sender 124, which may be configured to send messages including an authentication result to the user devices 190A-B. In an example embodiment, the specialized message sender 124 may send messages to the associated user-visible pages 172A-F and/or hidden pages 174A-C running on the browser of the user device 190A-B. The specialized message sender 124 may also send messages to the application servers 110A-B.

FIG. 2 illustrates an example user-visible page 172A, according to an example embodiment of the present disclosure. A user-visible page 172A may include user-specific content 210 and general content 220. The user-specific content 210 may include a user's identity, username, or any other personal identifier associated with a specific user. In an example embodiment, the user-specific content 210 may include a user permission set, which may also include user preferences. Additionally, in an example embodiment, the user-specific content 210 may be formatted to fit within a placeholder 230 that is reserved when the user-visible page 172A is rendered. The general content 220 may include content a provider (e.g., application 170A-C) would like to convey to all users regardless of permission level. For example, the general content 220 may include information such as news stories, sporting event scores and schedules, etc. In an illustrative example, the general content of a news application or website may include several small excerpts and headlines from the day's top stories. If the user is authenticated (e.g., logged in), then the user-visible page 172A may be updated to include user-specific content such as a "welcome John Doe" message in the upper right hand corner of the page. Additionally, the user-specific content may include user preferences, such as a toolbar with links the user's most frequently visited sections of news (e.g., "sports" and/or "business").

Figure 3B:
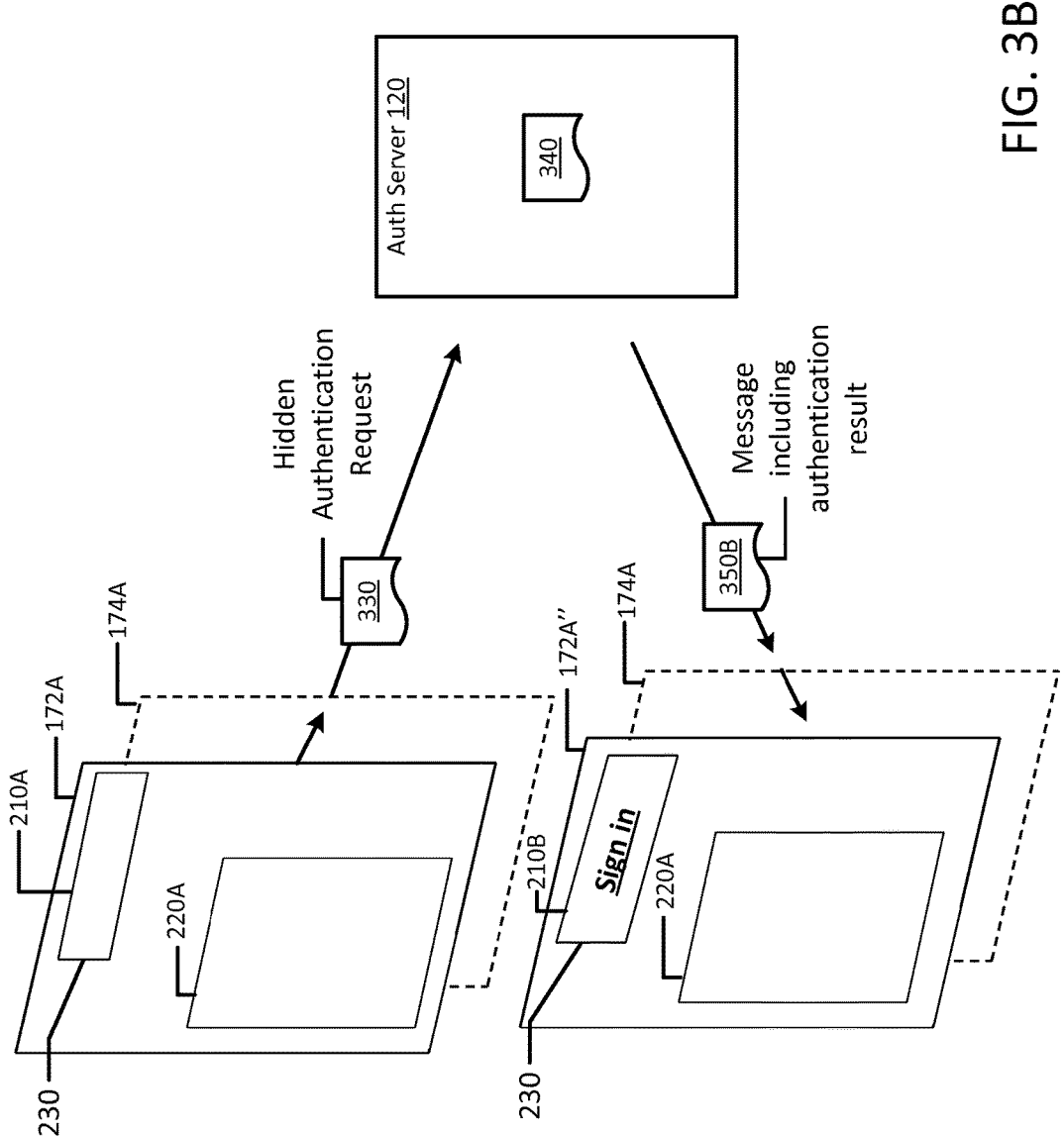
FIG. 3B illustrates a block diagram of an example user device with a user-visible page and a hidden page interacting with an authentication server according to an example embodiment of the present disclosure.

FIGS. 3A and 3B illustrate user-visible pages 172A, 172A', 172A", and a hidden page 174A associated with an application 170A-C communicating to an application server 110A-B in accordance with an example embodiment of the present disclosure. For example, when a user accesses a user-visible page 172A, an application server (e.g., App server 110A) requests a hidden page 174A. The user device (e.g., user device 190A-B, hereinafter user device 190) receives the request and renders the hidden page 174A in the background (e.g., so that the operation is not visible to the user). In an example embodiment, the user device 190 sends a hidden authentication request 330 to an application server 120. The hidden authentication request 330 may be sent by the hidden page 174A. In another example embodiment, the hidden authentication request 330 may be sent by the user-visible page 172A. After the authentication server 120 receives the hidden authentication request 330, the authentication server 120 obtains an authentication result 340. For example, the hidden authentication request 330 may include user credentials that are reviewed by the authentication server 120 to determine if the user exists on an authentication database stored in memory device 140D or 140E. The authentication result 340 may include a positive authentication result or a negative authentication result. A positive authentication result occurs when the authentication server 120 determines that the user credentials included in the hidden authentication request 330 match the credentials stored in the authentication database. A negative authentication result occurs when the authentication server 120 determines that the user credentials included in the hidden authentication request 330 do not exist on the authentication database or do not match the user credentials stored in the authentication database. Once an authentication result 340 is obtained by the authentication server 120, the authentication server 120 may send a message including the authentication result 350 to the user device 190.

As illustrated in FIG. 3A, if the user device 190 receives a message including a positive authentication result 350A, then the user device 190A-B may update (e.g., render) the user-specific content from 210A (e.g., an empty placeholder 230) to 210B (e.g., the message of "welcome John Doe" inserted into the placeholder 230). As the user-specific content 210 changes from a blank placeholder 230 in 210A to a welcome message in 210B, the general content 220A of the page may remain completely unchanged in both content and format, which advantageously allows a user to continue viewing the general content 220A without being interrupted by a page refresh. Additionally, the user will be unaffected by any reformatting of the general content 220A that may occur with other techniques because in an example embodiment, the placeholder 230 ensures that user-visible page is rendered with the proper spacing available for any additional user-specific content 210 that will be updated on the user-visible page 172A. Since the user has been authenticated, the user may now navigate to other user-visible pages (e.g., 172B) associated with the application 170A without the need to be re-authenticated by the hidden page 174A. Additionally, the user may be able to access related user-visible pages on other applications or sub-applications integrated on a providers page. For example, application 170B may be a partner application to application 170A, and the user may be allowed to access other user-visible pages (e.g., 172E-F) on that application 170B.

As illustrated in FIG. 3B, if the user device receives a message including a negative authentication result 350B, then the user device 190 may update (e.g., render) the user-specific content from 210A (e.g., an empty placeholder 230) to 210C (e.g., a "Sign in" button or link is placed in the placeholder 230). As the user-specific content 210 changes from a blank placeholder 230 in 210A to a "Sign in" button in 210C, the general content 220A of the page may remain unchanged in both content and format, which advantageously allows a user to continue viewing the general content 220A without being interrupted by a page refresh. Then, if the user would like to access privileged content or user-specific content 210 on the user-visible page 172A, the user may select the "Sign in" button and enter their login credentials. For example, after the blank placeholder 230 is updated, the user may continue reading general content 220 without interruption, until all desired general content 220 is read, and then when it is convenient for the user, the user may select the "Sign in" button 210C. In another example embodiment, the user device 190 may redirect the user to a different user-visible page (e.g., a login page) that includes at least one login credential entry field such as a username entry field, email entry field, password entry field, etc.

In an example embodiment, the authentication server may use an authentication cookie, a kerberos ticket, or a stored device identity. The hidden authentication request 330 may include an authentication cookie, a kerberos ticket, or a stored device identity. For example, the authentication server 120 may receive a hidden authentication request 330, such as a cookie that includes an authentication cookie in the cookie header. The authentication cookie may include user information such as a user name, email address, etc. from the authentication cookie (e.g., in the cookie header). In another example embodiment, the hidden authentication request 330 may include a kerberos ticket. Additionally, in an example embodiment, the hidden authentication request 330 may include a stored device identity, such as a certificate that is burned into the user device 190 on provisioning, which may be used to associate a user device 190 with a specific user.

For example, referring back to FIG. 1, if a user tries to access a user-visible page 172A of an application 170A operating on domain 160A (e.g., www.first-example.com/firstpage) on a user device 190, the application server 110A will serve the user-visible page 172A (e.g., www.first-example.com/firstpage). Then, the application server 110A may request a hidden page. The functionality of requesting a hidden page may be set up for each respective application (e.g., App 170A, App 170B, and App 170C), such that, in an example embodiment, every user-visible page (e.g., 172A-B) or entry point on the application (e.g., App 170A) would have the functionality of requesting a hidden page (e.g., 174A) and sending a hidden authentication request 330 to the authentication server 120. For example, if the user visits the user-visible page 172A, such as www.first-example.com/firstpage on an associated application (e.g., App 170A) or if the user visits a different user-visible page (e.g., 172B), such as www.first-example.com/secondpage, the application server (e.g., 110A) is triggered to request a hidden page 174A associated with the application (e.g., App 170A). Once the user-visible page 172A loads on the user device 190, the user device may send the hidden authentication request 330. For example, when the user device 190 renders the user-visible page 172A, the associated hidden page 174A may send a hidden authentication request 330 to the authentication server 120. In an example embodiment, the user-visible page 172A may send the hidden authentication request 330.

The user-visible page 172A (e.g., www.first-example.com/firstpage) is rendered with the general content 220A and a placeholder 230 for the user-specific content 210. As initially rendered, the user-visible page 172A may include an empty placeholder 230 without any user-specific content 210A. As the authentication server 120 is obtaining an authentication result 340, the user is advantageously able to view the general content 220A on the user-visible page 172A without being interrupted with a page refresh. If the authentication server 120 receives a positive authentication result 340A, the authentication server 120 may send a message including the positive authentication result 350A to the user device 190. In an example embodiment, the authentication server 120 may send the message including the positive authentication result 350A to the hidden page 174A. Then, the hidden page 174A may send a message based on the message received from the authentication server to the user-visible page 172A. In an example embodiment, the hidden page 174A may send a message to the user-visible page 172A, the user device 190, or the application server 110A. The message may include instructions to update the user-specific content 210A of the user-visible page 172A. In an example embodiment, the authentication server 120 may send the message including the authentication result to the user-visible page 172A. Then, the user-visible page 172A may update the user-specific content 210A on the user-visible page 172A to provide user-visible page 172A'. For example, the placeholder 230 on www.first-example.com/firstpage may be updated from 210A (e.g., an empty placeholder 230) to 210B, such that the placeholder 230 displays the message "welcome John Doe" without disrupting the format or the general content on the user-visible page 172A', and without requiring a page refresh. In an example embodiment, the user-specific content 210 may include a username, a user permission set, or any other user-specific content needed by the application to build a user-interface.

Once the user is authenticated and logged in, the user may navigate to other user-visible pages, such as user-visible page 172E. In an example embodiment, the user-visible page 172E may be associated with a different application (e.g., App 170C) on a different application server (e.g., application server 110B), or the user-visible page may be associated with an application on the same application server (e.g., user-visible page 172C associated with application 170B on application server 110A). Additionally, the user-visible page 172E may be associated with an application 170C and application server 110B that operates on a different domain (e.g., domain 160B) than the domain (e.g., domain 160A) that the user was initially authenticated on. For example, the user may navigate to www.second-example.com/firstpage (e.g., user-visible page 172E), which is a different domain than www.first-example.com/firstpage, and the user-visible page 172E associated with application 170C may include the same functionality to allow the user to access the general content 220 associated with user-visible page 172E while the hidden page 174C and the authentication server 120 authenticates the user.

In an example embodiment, the authentication server 120 may obtain a negative authentication result 340B. For example, if a user tries to access a user-visible page 172A of an application (e.g., www.first-example.com/firstpage) on a user device 190, the application server 110A will serve the user-visible page 172A (e.g., www.first-example.com/firstpage). Once the user-visible page 172A loads on the user device 190 (e.g., the user device 190 renders the user-visible page 172A), the associated hidden page 174A may send a hidden authentication request 330 to the authentication server 120. The user-visible page 172A may be rendered with the general content 220A and a placeholder 230 for the user-specific content 210A. As the authentication server 120 is obtaining an authentication result 340, the user is advantageously able to view the general content 220A on the user-visible page 172A without being interrupted with a page refresh. If the authentication server 120 receives a negative authentication result 340B, the authentication server 120 may send a message including the negative authentication result 350B to the user device 190. In an example embodiment, the authentication server 120 may send the message including the authentication result 350 to the hidden page 174A. Then, the hidden page 174A may send a message based on the message received from the authentication server to the user-visible page 172A or the application server 110A. In an example embodiment, the authentication server 120 may send the message including a negative authentication result 350B to the user-visible page 172A. Then, the user-visible page 172A may update the user-specific content 210A on the user-visible page 172A to provide user-visible page 172A". For example, the placeholder 230 on www.first-example.com/firstpage may be updated from 210A (e.g., an empty placeholder 230) to 210C, such that the placeholder 230 displays a "Sign in" button or link without disrupting the format or the general content on the page, and without requiring a page refresh. In another example embodiment, the hidden page 174A may send a message including instructions to send the user to a different user-visible page (e.g., a login page) to provide login credentials. In another example embodiment, the authentication server may send the message including the authentication result to the user-visible page. Then, the user may be redirected from the user-visible page 172A (e.g., www.first-example.com/firstpage) to a different user-visible page, such as a login page (e.g., www.first-example.com/login). If the user provides satisfactory login credentials, then the user may be sent to the original user-visible page 172A' complete with user-specific content (e.g., a "welcome John Doe" message).

Figure 4A:
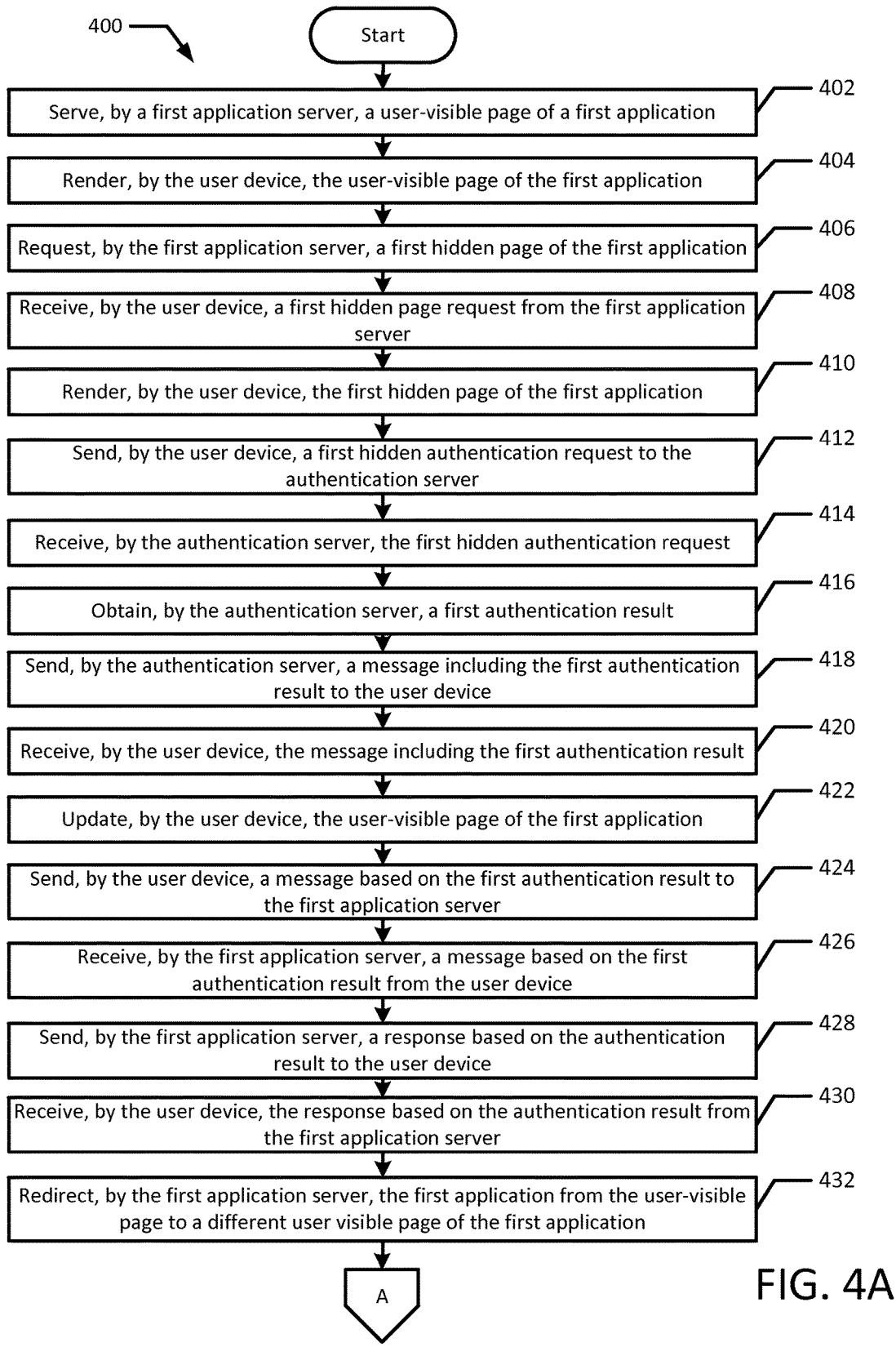

FIGS. 4A and 4B illustrate a flow diagram of an example method 400 for cross-domain single login in accordance with an example embodiment of the present disclosure. Although the example method 400 is described with reference to the flowchart illustrated in FIGS. 4A and 4B, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

In the illustrated embodiment, a first application server 110A serves a user-visible page 172A associated with a first application 170A to a user device (e.g., user device 190A-B, hereinafter user device 190) (block 402). The first application 170A operates on domain 160. Then, the user device 190 renders the user-visible page 172A (e.g., image data of a webpage) (block 404). The first application server 110A requests a first hidden page 174A associated with the first application 170A (block 406). The user device 190 receives the hidden page request from the first application server 110A (block 408). Then, the user device 190 renders the first hidden page 174A (block 410). The user device 190 sends a first hidden authentication request 330 to an authentication server 120 (block 412). The hidden authentication request 330 may be sent by the first hidden page 174A rendered on the user device 190, or the hidden authentication request 330 may be sent by the first user-visible page 172A rendered on the user device 190. The authentication server 120 receives the first hidden authentication request 330 from the user device 190 (e.g., the authentication server 120 may receive the first hidden authentication request 330 from the user-visible page 172A, the hidden page 174A, or from the browser on the user device 190) (block 414). Then, the authentication server 120 obtains a first authentication result 340 (block 416). The authentication result may be a positive authentication result 340A (i.e., the user is authenticated) or a negative authentication result 340B (i.e., the user has not been authenticated). Next, the authentication server 120 sends a message including the first authentication result 350 to the user device 190 (block 418). The message including the authentication result 350 may be formatted by the authentication server so that it can be properly received by the user device 190. For example, the message including the authentication result 350 may have additional information including formatting headers, etc. so that it can be properly received by either the hidden page 174A, the user-visible page 172A, and/or a browser on the user device 190. The user device 190 receives the message including the authentication result 350 from the authentication server 120 (block 420). Upon receiving a message including a positive authentication result 350A, the user device 190 may update the first user-visible page 172A (block 422). For example, the user device 190 may update the user-specific content 210 of the first user-visible page 172A. In an example embodiment, the hidden page 174A may receive a message including the authentication result 350 from the authentication server 120 and, in response to receiving the message 350, may send a message based on the authentication result to either the user-visible page 220A or the application server 110A. Then, the user device 190 (e.g., a browser the user device 190, the user-visible page 220A, or the hidden page 174A) may send a message based on the first authentication result to the first application server 110A (block 424). The message may be a second message that differs from the message including the authentication result 350, or the second message may be the same message including the authentication result, which is forwarded to the application server 120 by the user device 190 (e.g., a browser on the user device 190, the user-visible page 220A, or the hidden page 174A). The first application server 110A receives message based on the first authentication result from the user device 190 (block 426). Upon receiving the second message based on the first authentication result from the user device 190, the first application server 110A may send a response based on the authentication result to the user device 190 (block 428). In an example embodiment, the first application server 110A may send the response to the user-visible page 172A, the hidden page 174A, or the browser of the user device 190. Then, the user device 190 receives the response based on the authentication result from the first application server 110A (block 430). In an example embodiment, the response based on the authentication result may include information that allows the user to access other related resources on the application 170A. Upon receiving a message including a negative authentication result 350, the user device 190 and/or application server 110A may redirect the first application 170A from the first user-visible page 172A to a second user-visible page 172B, such as a login page (block 432).

The flow diagram continues in FIG. 4B. A user may access a third user-visible page 172E of a second application 170C. The second application 170C operates on domain 160B. In an example embodiment, domain 160B may be different than domain 160A. In another example embodiment, domain 160A and domain 160B may be the same. In the illustrated embodiment, a second application server 110B serves a user-visible page 172E associated with the second application 170C to a user device 190 (block 434). Then, the user device 190 renders the user-visible page 172E (e.g., image data of a webpage) (block 436). The second application server 110B requests the second hidden page 174E associated with the second application 170C (block 438). The user device 190 receives the hidden page request from the second application server 110B (block 440). Then, the user device 190 renders the second hidden page 174C (block 442). The user device 190 sends a second hidden authentication request 330 to the authentication server 120 (block 444). The second hidden authentication request 330 may be sent by the second hidden page 174C rendered on the user device 190, or the hidden authentication request 330 may be sent by the third user-visible page 172E rendered on the user device 190. The authentication server 120 receives the second hidden authentication request 330 from the user device 190 (e.g., the authentication server 120 may receive the second hidden authentication request 330 from the user-visible page 172E, the hidden page 174C, or from the browser on the user device 190) (block 446). Then, the authentication server 120 obtains a second authentication result 340 (block 448). The second authentication result 340 may be a positive authentication result 340A (i.e., the user is authenticated) or a negative authentication result 340B (i.e., the user has not been authenticated). Next, the authentication server 120 sends a message including the second authentication result 350 to the user device 190 (block 450). The message including the authentication result 350 may be formatted by the authentication server 120 so that it can be properly received by the user device 190. For example, the message including the authentication result 350 may have additional information including formatting headers, etc. so that it can be properly received by either the hidden page 174C, the user-visible page 172E, and/or a browser on the user device 190. The user device 190 receives the message including the authentication result 350 from the authentication server 120 (block 452). Thus, this method advantageously works without extra user-visible page requests, and will work even across application frameworks (e.g., web applications in different domains) without having all applications on the same domain, as is generally required for shared cookies. Upon receiving a message including a positive authentication result 350A, the user device 190 may update the third user-visible page 172E (block 454). For example, the user device 190 may update the user-specific content 210 of the third user-visible page 172E. In an example embodiment, the hidden page 174C may receive a message including the authentication result 350 from the authentication server 120 and, in response to receiving the message 350, may send a message based on the authentication result to either the user-visible page 220A or the application server 110B. Then, the user device 190 (e.g., a browser on the user device 190, the user-visible page 172E, or the hidden page 174C) may send a message based on the second authentication result to the second application server 110B (block 456). The message may be a fourth message that differs from the message including the authentication result 350, or the fourth message may be the same message including the authentication result 350, which is forwarded to the application server 120 by the user device 190 (e.g., a browser on the user device 190, the user-visible page 172E, or the hidden page 174C). The second application server 110B receives the message based on the second authentication result from the user device 190 (block 458). Upon, receiving a message based on the second authentication result from the user device 190, the second application server 110B may send a response based on the authentication result to the user device 190 (block 460). In an example embodiment, the second application server 110B may send the response to the user-visible page 172E, the hidden page 174C, or the browser of the user device 190. Then, the user device 190 receives the response based on the authentication result from the second application server 110B (block 462). In an example embodiment, the response based on the authentication result may include information that allows the user to access other related resources on the application 170C. Upon receiving a message including a negative authentication result 350B, the user device 190 and/or application server 110B may redirect the second application 170C from the third user-visible page 172E to a fourth user-visible page 172F, such as a login page (block 464).

Figure 5:
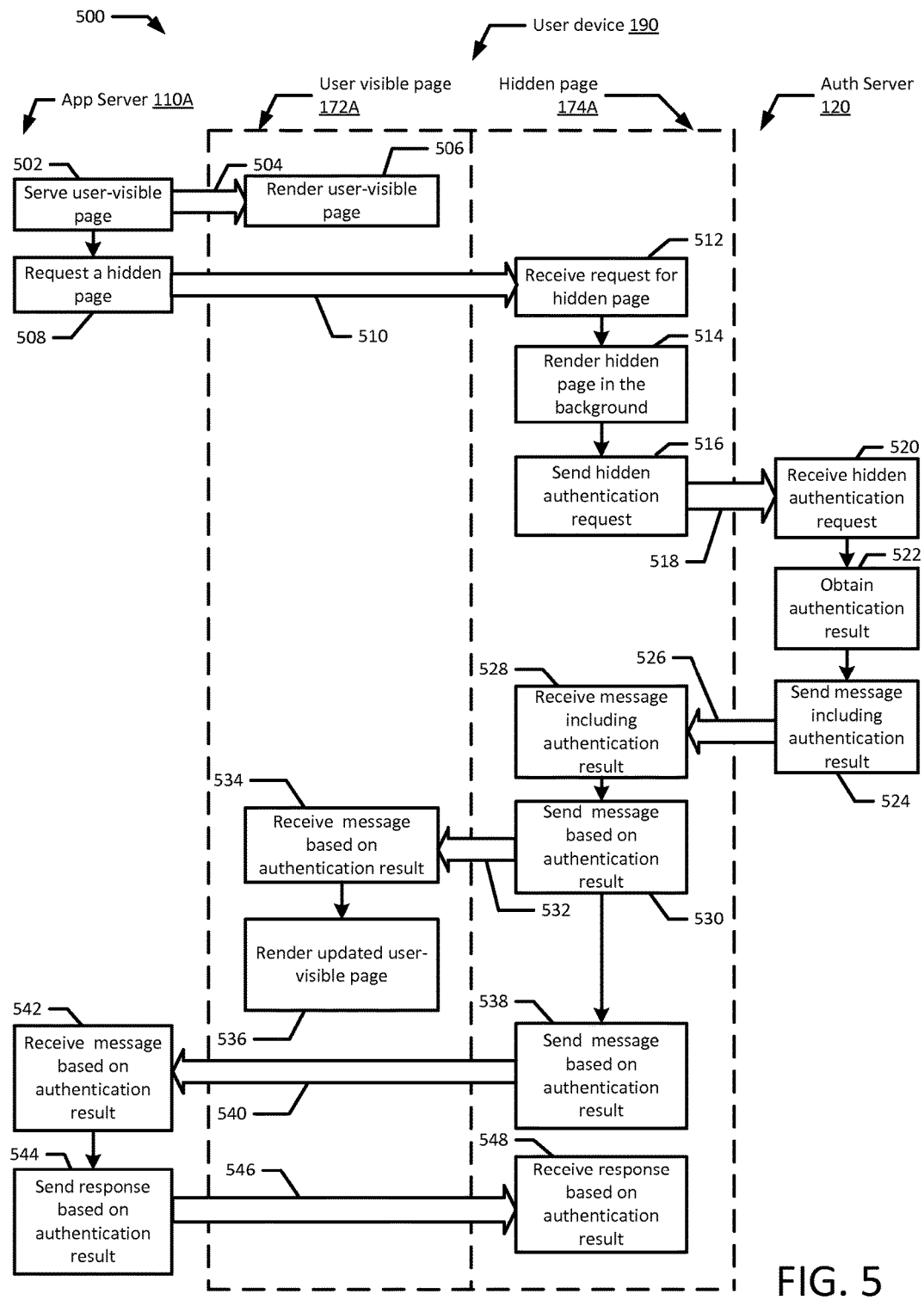
FIG. 5 illustrates a flow diagram of an example process for cross-domain single login according to an example embodiment of the present disclosure.

FIG. 5 depicts a flow diagram illustrating an example method 500 of cross-domain single login according to an example embodiment of the present disclosure. Although the example method 500 is described with reference to the flowchart illustrated in FIG. 5, it will be appreciated that many other methods of performing the acts associated with the method may be used. For example, the order of some of the blocks may be changed, certain blocks may be combined with other blocks, and some of the blocks described are optional. The method may be performed by processing logic that may comprise (e.g., circuitry, dedicated logic, etc.), software, or a combination of both.

In the illustrated example embodiment, an application server 110A serves a hidden page 172A to a user device 190 (blocks 502 and 504). In an example embodiment, the application server 110A may serve the hidden page 172A to the user device's browser. The user device 190 renders the user-visible page 172A (block 506). The application server 110A also requests a hidden page on the user device 190 (block 508 and 510). In an example embodiment, the application server 110A may send the request for the hidden page 174A and serve the user-visible page 172A simultaneously, the request for the hidden page 174A may be sent before serving the user-visible page 172A, or the request for the hidden page 174A may be sent after serving the user-visible page 172A. Then, the user device 190 receives the request for the hidden page and renders the hidden page in the background (blocks 512 and 514). Then, the user-device 190 may send a hidden authentication request 330 to the authentication server 120 (blocks 516 and 518). In an example embodiment, the hidden authentication request may be sent by the user-visible page 172A, the hidden page 174A, or the browser on the user-device 190. The authentication server 120 receives the hidden authentication request 330 and obtains an authentication result 340 (blocks 520 and 522). For example, the hidden authentication request may include user credentials that can be matched against user information stored in the authentication server 120. For example, the hidden authentication request may include a certificate or identifier of the user device 190 (e.g., an identifier burned into the user device on provisioning). Then, the authentication server 120 sends a message including the authentication result 350 to the user device (blocks 524 and 526). The authentication server 120 may send the message including the authentication result 350 to the hidden page 174A, the user-visible page 172A, or the browser on the user device 190. The user device 190 (e.g., the user-visible page 172A and/or hidden page 174A) receives the message including the authentication result 350 (block 528). Then, the user device 190 may send a message based on the authentication result (e.g., based on message 350) to the user-visible page 172A (blocks 530 and 532). In an example embodiment, the hidden page 174A may receive the message including the authentication result 350 and may send a different message to the user-visible page 172A. In another example embodiment, the user device 190 may also forward the message including the authentication result 350 to the user-visible page 172A or the hidden page 174A. Then, the user device receives the message based on the authentication result and may render and updated version of the user-visible page 172A' (blocks 534 and 536). The user device (e.g., the hidden page 174A and/or the user-visible page 172A) may then send a message based on the authentication result to the application server 110A (blocks 538 and 540). In an example embodiment, the steps described in (blocks 524 through 538) may happen simultaneously or in different sequences. Additionally, in an example embodiment, the message including the authentication result 350 may be altered before being exchanged between the user device 190 and the application server 110A, or the message may remain the same. Then, the application server receives the message based on the authentication result and sends a response based on the authentication result to the user device 190 (blocks 542, 544, and 546). In an example embodiment, the response may be sent to the user-visible page 172A, the hidden page 174A, and/or the browser on the user device 190. For example, the application server 110A may send a cookie along with the response to the hidden page 174A, which the browser sends during following requests, so the application 170A can tie the user's session to the browser. Finally, the user device receives the response based on the authentication result (block 548). Accordingly, the application 170A knows the user is authenticated and the user may access all user-visible pages associated with the application (e.g., user visible pages 172A-B). The example method 500 explained above, may be performed with another application 170B associated with the same application server (e.g., application server 110A) so that the user can be logged in with the same credentials without being interrupted. Additionally, the example method 500 may occur across different domains to advantageously provide cross-domain single login among multiple applications that have been set up with the described single login functionality.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a system comprising a first application server and an authentication server. The first application server hosts a first application that has a first user-visible page. Additionally, the first application server is configured to serve, the first user-visible page, of the first application, on a user device. The first application is configured to operate on a first domain, and the first user-visible page includes first user-specific content and first general content. The first application is also configured to request, a first hidden page of the first application. The authentication server is configured to receive, a first hidden authentication request from the user device. Additionally, the authentication server is configured to obtain, a first authentication result. The first authentication result includes either a positive authentication result or a negative authentication result. Furthermore, the authentication server is configured to send, a first message to the user device. The first message may include the first authentication result obtained by the authentication server based on the first hidden authentication request. The user device is configured to send, a second message to the first user-visible page based on the first message.

In accordance with another example aspect of the present disclosure, which may be used in combination with any one or more of the preceding aspects, the first application server is further configured to receive a third message from the user device. The third message is based on the first authentication result.

In accordance with another example aspect of the present disclosure, which may be used in combination with any one or more of the preceding aspects, the first application server is further configured to send a response based on the first authentication result to the user device.

In accordance with another example aspect of the present disclosure, which may be used in combination with any one or more of the preceding aspects, the user device is configured to update the user-specific content of the first user-visible page upon receiving the first message based on the first authentication request having a positive authentication result, while the general content remains unchanged.

In accordance with another example aspect of the present disclosure, which may be used in combination with any one or more of the preceding aspects, the user-specific content is a least one of a user name and a user permission set.

In a second example aspect of the present disclosure, a method for providing cross-domain single login comprises serving, by a first application server to a user device, a first user-visible page of a first application, wherein the first application is configured to operate on a first domain, and the first user-visible page includes first user-specific content and first general content. The method further comprises, responsive to serving the first user-visible page of the first application, requesting, by the first application server, a first hidden page of the first application, wherein the user device is configured to send a first hidden authentication request to an authentication server, and responsive to sending the first hidden authentication request, receive a first message from the authentication server, the first message including a first authentication result. The method further comprises, responsive to sending the first hidden authentication request, receiving, by the first application server, a second message from the user device, wherein the second message is based on the first authentication result obtained by the authentication server based on the first hidden authentication request, and the first authentication result includes one of a positive authentication result and a negative authentication result.

In accordance with another example aspect of the present disclosure, which may be used in combination with any one or more of the preceding aspects, the method for providing cross-domain single login further comprises serving, by a second application server, a second user-visible page, of a second application, on the user device, wherein the second application is configured to operate on a second domain, wherein the second domain is different than the first domain, and the second user-visible page includes second user-specific content and second general content. The method further comprises, responsive to serving the second user-visible page of the second application, requesting, by the second application server, a second hidden page of the second application, wherein the user device is configured to: send a second hidden authentication request to the authentication server, and responsive to sending the second hidden authentication request, receive a third message from the authentication server, the third message including a second authentication result. The method further comprises, responsive to sending the second hidden authentication request, receiving, by the second application server, a fourth message from the user device, wherein the fourth message is based on the second authentication result obtained by the authentication server based on the second hidden authentication request, and the second authentication result includes one of a positive authentication result and a negative authentication result.

In accordance with another example aspect of the present disclosure, which may be used in combination with any one or more of the preceding aspects, the method for providing cross-domain single login further comprises redirecting, by the first application server, the first application from the first user-visible page to a third user-visible page based upon receiving a negative authentication result.

In accordance with another example aspect of the present disclosure, which may be used in combination with any one or more of the preceding aspects, the third user-visible page includes at least one login credential entry field.

In accordance with another example aspect of the present disclosure, which may be used in combination with any one or more of the preceding aspects, the first authentication request includes at least one of an authentication cookie, a kerberos ticket, and a stored device identity.

In a third example aspect of the present disclosure, a method for providing cross-domain single login comprises receiving, by an authentication server, a first hidden authentication request from a first hidden page of a first application, wherein the first hidden page is rendered in response to a first application server requesting the first hidden page based on the first application server serving a first user-visible page of the first application, the first application is configured to operate on a first domain, and the first user-visible page includes first user-specific content and first general data. The method further comprises, in response to receiving the authentication request, obtaining, by the authentication server, a first authentication result, wherein the first authentication result includes one of a positive authentication result and a negative authentication result. The method further comprises, in response to obtaining the first authentication result, sending, by the authentication server, a first message to the first hidden page, wherein the first hidden page is configured to send a second message to the first user-visible page upon receiving the first message from the authentication server. The method further comprises receiving, by the authentication server, a second hidden authentication request from a second hidden page of a second application, wherein the second hidden page is rendered in response to a second application server requesting the second hidden page based on the second application server serving a second user-visible page of the second application, the second application is configured to operate on a second domain, wherein the second domain is different than the first domain, and the second user-visible page includes user-specific content and general data. The method further comprises, in response to receiving the second authentication request, obtaining, by the authentication server, a second authentication result, wherein the second authentication result includes one of a positive authentication result and a negative authentication result. The method further comprises, in response to obtaining the second authentication result, sending, by the authentication server, a third message to the second hidden page, wherein, the second hidden page is configured to send a fourth message to the second user-visible page upon receiving the third message from the authentication server.

In accordance with another example aspect of the present disclosure, which may be used in combination with any one or more of the preceding aspects, the first hidden page is rendered in response to the first application server requesting the first hidden page based on the first application server serving a third user-visible page of the first application.

In accordance with another example aspect of the present disclosure, which may be used in combination with any one or more of the preceding aspects, the first user-visible page is a first uniform reference locator (URL) and the third user-visible page is a second URL.

In accordance with another example aspect of the present disclosure, which may be used in combination with any one or more of the preceding aspects, sending the first message having a positive authentication result causes the first user-visible page to update the user-specific content of the first user-visible page.

In accordance with another example aspect of the present disclosure, which may be used in combination with any one or more of the preceding aspects, the user-specific content is a least one of a user name and a user permission set.

In accordance with another example aspect of the present disclosure, which may be used in combination with any one or more of the preceding aspects, sending the first message having a negative authentication result causes the user device to update the user-specific content of the first user-visible page to include a login button.

In accordance with another example aspect of the present disclosure, which may be used in combination with any one or more of the preceding aspects, the first authentication request and the second authentication request comprise at least one of an authentication cookie, a kerberos ticket, and a stored device identity.

In a fourth example aspect of the present disclosure, a non-transitory machine readable medium storing code, which when executed by a user device, is configured to render a first user-visible page, of a first application, received from a first application server, wherein the first application is configured to operate on a first domain. The non-transitory machine readable medium is further configured to receive a request for a first hidden page from the first application server. The non-transitory machine readable medium is further configured to, responsive to receiving the request for the first hidden page, render, the first hidden page, of the first application. The non-transitory machine readable medium is further configured to send a first authentication request to an authentication server. The non-transitory machine readable medium is further configured to, responsive to sending the first hidden authentication request, receive, a first message, wherein the first message includes a first authentication result obtained by the authentication server based on the first hidden authentication request, wherein the first authentication result includes one of a positive authentication result and a negative authentication result. The non-transitory machine readable medium is further configured to, responsive to receiving the first message from the authentication server, send, a second message to the first hidden page.

In accordance with another example aspect of the present disclosure, which may be used in combination with the any one or more of the preceding aspects, the non-transitory machine readable medium is further configured to update the user-specific content of the first user-visible page upon receiving the first message based on the first authentication request having a positive authentication result.

In accordance with another example aspect of the present disclosure, which may be used in combination with the any one or more of the preceding aspects, the user-specific content is a least one of a user name and a user permission set.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a first application server hosting a first application having a first user-visible page, the first application server configured to:
serve the first user-visible page, of the first application, on a user device, wherein
the first application is configured to operate on a first domain, and
the first user-visible page includes first user-specific content and first general content, and
request a first hidden page of the first application; and
an authentication server configured to:
receive a first hidden authentication request from the user device,
obtain a first authentication result, wherein the first authentication result includes one of a positive authentication result and a negative authentication result,
send a first message to the user device, wherein
the first message includes the first authentication result obtained by the authentication server based on the first hidden authentication request, and
the user device is configured to send a second message to the first user-visible page based on the first message.

2. The system of claim 1, wherein the first application server is further configured to receive, a third message from the user device, wherein the third message is based on the first authentication result.

3. The system of claim 2, wherein the first application server is further configured to send a response based on the first authentication result to the user device.

4. The system of claim 1, wherein the user device is configured to update the first user-specific content of the first user-visible page upon receiving the first message based on the first authentication request having a positive authentication result, while the first general content remains unchanged.

5. The system of claim 4, wherein the first user-specific content is a least one of a user name and a user permission set.

6. A method for providing cross-domain single login comprising:
serving, by a first application server to a user device, a first user-visible page of a first application, wherein
the first application is configured to operate on a first domain, and
the first user-visible page includes first user-specific content and first general content;
responsive to serving the first user-visible page of the first application, requesting, by the first application server, a first hidden page of the first application,
wherein the user device is configured to:
send a first hidden authentication request to an authentication server, and responsive to sending the first hidden authentication request, receive a first message from the authentication server, the first message including a first authentication result; and responsive to the user device sending the first hidden authentication request, receiving, by the first application server, a second message from the user device, wherein the second message is based on the first authentication result obtained by the authentication server based on the first hidden authentication request, and the first authentication result includes one of a positive authentication result and a negative authentication result.

7. The method of claim 6, further comprising:

serving, by a second application server, a second user-visible page, of a second application, on the user device, wherein the second application is configured to operate on a second domain, wherein the second domain is different than the first domain, and the second user-visible page includes second user-specific content and second general content;

responsive to serving the second user-visible page of the second application, requesting, by the second application server, a second hidden page of the second application, wherein the user device is configured to:

send a second hidden authentication request to the authentication server, and responsive to sending the second hidden authentication request, receive a third message from the authentication server, the third message including a second authentication result; and responsive to sending the second hidden authentication request, receiving, by the second application server, a fourth message from the user device, wherein the fourth message is based on the second authentication result obtained by the authentication server based on the second hidden authentication request, and the second authentication result includes one of a positive authentication result and a negative authentication result.

8. The method of claim 6, further comprising redirecting, by the first application server, the first application from the first user-visible page to a third user-visible page based upon receiving a negative authentication result.

9. The method of claim 8, wherein the third user-visible page includes at least one login credential entry field.

10. The method of claim 6, wherein the first authentication request includes at least one of an authentication cookie, a kerberos ticket, and a stored device identity.

11. A method for providing cross-domain single login comprising:

receiving, by an authentication server, a first hidden authentication request from a first hidden page of a first application, wherein the first hidden page is rendered in response to a first application server requesting the first hidden page based on the first application server serving a first user-visible page of the first application, the first application is configured to operate on a first domain, and the first user-visible page includes first user-specific content and first general data;

in response to receiving the first hidden authentication request, obtaining, by the authentication server, a first authentication result, wherein the first authentication result includes one of a positive authentication result and a negative authentication result;

in response to obtaining the first authentication result, sending, by the authentication server, a first message to the first hidden page, wherein the first hidden page is configured to send a second message to the first user-visible page upon receiving the first message from the authentication server;

receiving, by the authentication server, a second hidden authentication request from a second hidden page of a second application, wherein the second hidden page is rendered in response to a second application server requesting the second hidden page based on the second application server serving a second user-visible page of the second application, the second application is configured to operate on a second domain, wherein the second domain is different than the first domain, and the second user-visible page includes second user-specific content and general data;

in response to receiving the second hidden authentication request, obtaining, by the authentication server, a second authentication result, wherein the second authentication result includes one of a positive authentication result and a negative authentication result; and in response to obtaining the second authentication result, sending, by the authentication server, a third message to the second hidden page, wherein, the second hidden page is configured to send a fourth message to the second user-visible page upon receiving the third message from the authentication server.

12. The method of claim 11, wherein the first hidden page is rendered in response to the first application server requesting the first hidden page based on the first application server serving a third user-visible page of the first application.

13. The method of claim 12, wherein the first user-visible page is a first uniform reference locator (URL) and the third user-visible page is a second URL.

14. The method of claim 11, wherein sending the first message having a positive authentication result causes the first user-visible page to update the first user-specific content of the first user-visible page.

15. The method of claim 14, wherein the first user-specific content is a least one of a user name and a user permission set.

16. The method of claim 11, wherein sending the first message having a negative authentication result causes the user device to update the first user-specific content of the first user-visible page to include a login button.

17. The method of claim 11, wherein the first authentication request and the second authentication request comprise at least one of an authentication cookie, a kerberos ticket, and a stored device identity.

18. A non-transitory machine readable medium storing code, which when executed by a user device, is configured to:

render a first user-visible page, of a first application, received from a first application server, wherein the first application is configured to operate on a first domain;

receive a request for a first hidden page from the first application server;

responsive to receiving the request for the first hidden page, render, the first hidden page, of the first application;

send a first authentication request to an authentication server;

responsive to sending the first hidden authentication request, receive, a first message, wherein the first message includes a first authentication result obtained by the authentication server based on the first hidden authentication request, wherein the first authentication result includes one of a positive authentication result and a negative authentication result; and responsive to receiving the first message from the authentication server, send, a second message to the first hidden page.

19. The non-transitory machine readable medium of claim 18, further configured to update user-specific content of the first user-visible page upon receiving the first message based on the first authentication request having a positive authentication result.

20. The non-transitory machine readable medium of claim 19, wherein the user-specific content is a least one of a user name and a user permission set.

* * * * *